(12) United States Patent
Holland

(10) Patent No.: US 9,395,869 B2
(45) Date of Patent: Jul. 19, 2016

(54) GLOBAL Z-ORDER FOR WINDOWS

(75) Inventor: Philip James Holland, Ypsilanti, MI (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 13/365,159

(22) Filed: Feb. 2, 2012

(65) Prior Publication Data

US 2013/0205239 A1   Aug. 8, 2013

(51) Int. Cl.
  *G06F 3/048*  (2013.01)
  *G06F 3/0481*  (2013.01)
  *G06F 9/44*  (2006.01)

(52) U.S. Cl.
  CPC ............ *G06F 3/0481* (2013.01); *G06F 9/4443* (2013.01); *G06F 2203/04803* (2013.01)

(58) Field of Classification Search
  CPC ....................................................... G06F 3/002
  USPC .................................. 715/766, 794
  See application file for complete search history.

(56) References Cited

U.S. PATENT DOCUMENTS

| | | | |
|---|---|---|---|
| 5,121,478 A * | 6/1992 | Rao ............................... | 715/804 |
| 5,483,261 A | 1/1996 | Yasutake | |
| 5,488,204 A | 1/1996 | Mead et al. | |
| 5,491,784 A * | 2/1996 | Douglas et al. ............... | 715/810 |
| 5,564,002 A * | 10/1996 | Brown ........................... | 715/778 |
| 5,682,550 A * | 10/1997 | Brown et al. .................... | 710/10 |
| 5,825,352 A | 10/1998 | Bisset et al. | |
| 5,835,079 A | 11/1998 | Shieh | |
| 5,841,435 A * | 11/1998 | Dauerer et al. ................ | 715/775 |
| 5,880,411 A | 3/1999 | Gillespie et al. | |
| 5,880,773 A * | 3/1999 | Suzuki ...................... | G02B 7/12 345/8 |
| 6,016,145 A * | 1/2000 | Horvitz et al. ................. | 715/788 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,437,803 B1 * | 8/2002 | Panasyuk .............. | G06F 9/4443 715/733 |
| 6,690,387 B2 | 2/2004 | Zimmerman et al. | |
| 7,015,894 B2 | 3/2006 | Morohoshi | |
| 7,159,189 B2 | 1/2007 | Weingart et al. | |
| 7,184,064 B2 | 2/2007 | Zimmerman et al. | |
| 7,663,607 B2 | 2/2010 | Hotelling et al. | |

(Continued)

FOREIGN PATENT DOCUMENTS

| | | | |
|---|---|---|---|
| JP | 2000-163031 A | 6/2000 | |
| JP | 2002-342033 A | 11/2002 | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — William Bashore
*Assistant Examiner* — Gregory A Distefano
(74) *Attorney, Agent, or Firm* — Morrison & Foerster LLP

(57) ABSTRACT

In some implementations, windows can be displayed based on a global z-order. The global z-order can be maintained for all open windows. The global z-order can include windows that are not currently displayed. The global z-order can define a display order of windows across multiple workspaces. In some implementations, workspaces can be associated with respective levels. The workspace levels can be used to determine how to display windows associated with each workspace when multiple workspaces are displayed simultaneously.

39 Claims, 10 Drawing Sheets

(56) References Cited

U.S. PATENT DOCUMENTS

| | | | |
|---|---|---|---|
| 7,676,761 | B2 * | 3/2010 | Oliver et al. ............... 715/803 |
| 8,054,319 | B2 | 11/2011 | Lee et al. |
| 8,479,122 | B2 | 7/2013 | Hotelling et al. |
| 2004/0056900 | A1 * | 3/2004 | Blume ....................... 345/807 |
| 2005/0188329 | A1 * | 8/2005 | Cutler et al. ............... 715/804 |
| 2005/0223334 | A1 * | 10/2005 | Guido ................. G06F 3/0481 715/794 |
| 2005/0273466 | A1 * | 12/2005 | Yoon ..................... G06F 3/0481 |
| 2006/0026521 | A1 | 2/2006 | Hotelling et al. |
| 2006/0197753 | A1 | 9/2006 | Hotelling |
| 2006/0230156 | A1 * | 10/2006 | Shappir et al. ............. 709/227 |
| 2008/0028321 | A1 * | 1/2008 | Weksler et al. ............ 715/748 |
| 2012/0005269 | A1 * | 1/2012 | Janssen et al. ............. 709/203 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

GLOBAL Z-ORDER FOR WINDOWS

TECHNICAL FIELD

This disclosure generally relates to displaying windows on a graphical user interface.

BACKGROUND

Modern operating systems employ windows for displaying information in graphical user interfaces. When multiple windows are displayed in a graphical user interface, the windows can be displayed in an overlapping manner to indicate a relative height or depth (e.g., z-order) of the windows. For example, a window that obscures another window can appear to be displayed over the obscured window.

Some operating systems provide for multiple workspaces. A workspace can be associated with one or more windows. For example, to increase the amount of space on an operating system desktop, the desktop can be expanded and divided up into multiple workspaces that can be viewed independently. A user can assign different windows to different workspaces and move between workspaces to view the different windows.

SUMMARY

In some implementations, windows can be displayed based on a global z-order. The global z-order can be maintained for all windows and can include windows that are not currently displayed. The global z-order can define a display order of windows across multiple workspaces. In some implementations, workspaces can be associated with levels. The workspace levels can be used to determine how to display windows associated with each workspace when multiple workspaces are displayed simultaneously.

Particular implementations provide at least the following advantages: Displaying windows based on a global z-order can provide a consistent window display across workspaces thereby reducing user confusion and improving ease of use. Displaying workspace windows based on workspace levels allows users to prioritize workspaces. Windows associated with high priority workspaces to be viewed and accessed more quickly than lower priority workspace windows.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Workspace Window Display Order

Figure 1:
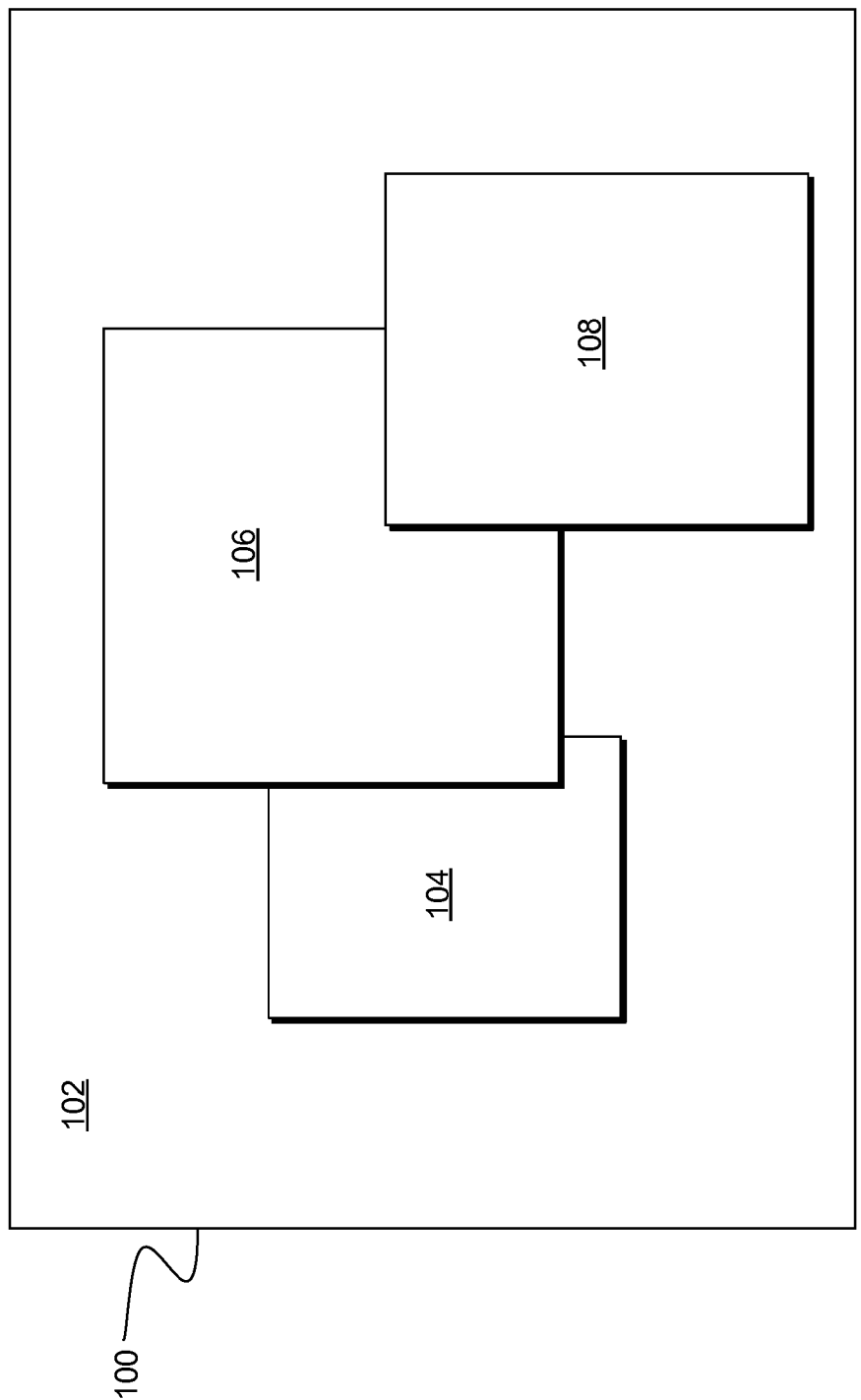
FIG. 1 illustrates an example graphical interface having multiple windows.

FIG. 1 illustrates an example graphical interface 100 having multiple windows. Graphical interface 100 can be an interface of a computing device. For example, graphical interface 100 can be an interface of a desktop computer, laptop computer, smartphone, tablet computer or other computing device. In some implementations, graphical interface 100 can display workspace 102. For example, workspace 102 can be associated with a grouping of windows that includes windows 104-108. Windows 104-108 can be windows of an operating system or application graphical user interface, for example.

In some implementations, windows can be displayed based on an elevation or z-order. The z-order can define an elevation display order (e.g., between a user and the desktop) of windows relative to other displayed windows. For example, window elevation or z-order can be shown by a window overlapping or obscuring another window. For example, window 106 partially obscures window 104 indicating that window 106 has a higher elevation (e.g., higher z-order) than window 104. Window 108 partially obscures window 108 indicating that window 108 has a higher elevation (e.g., z-order) than window 106.

Figure 2:
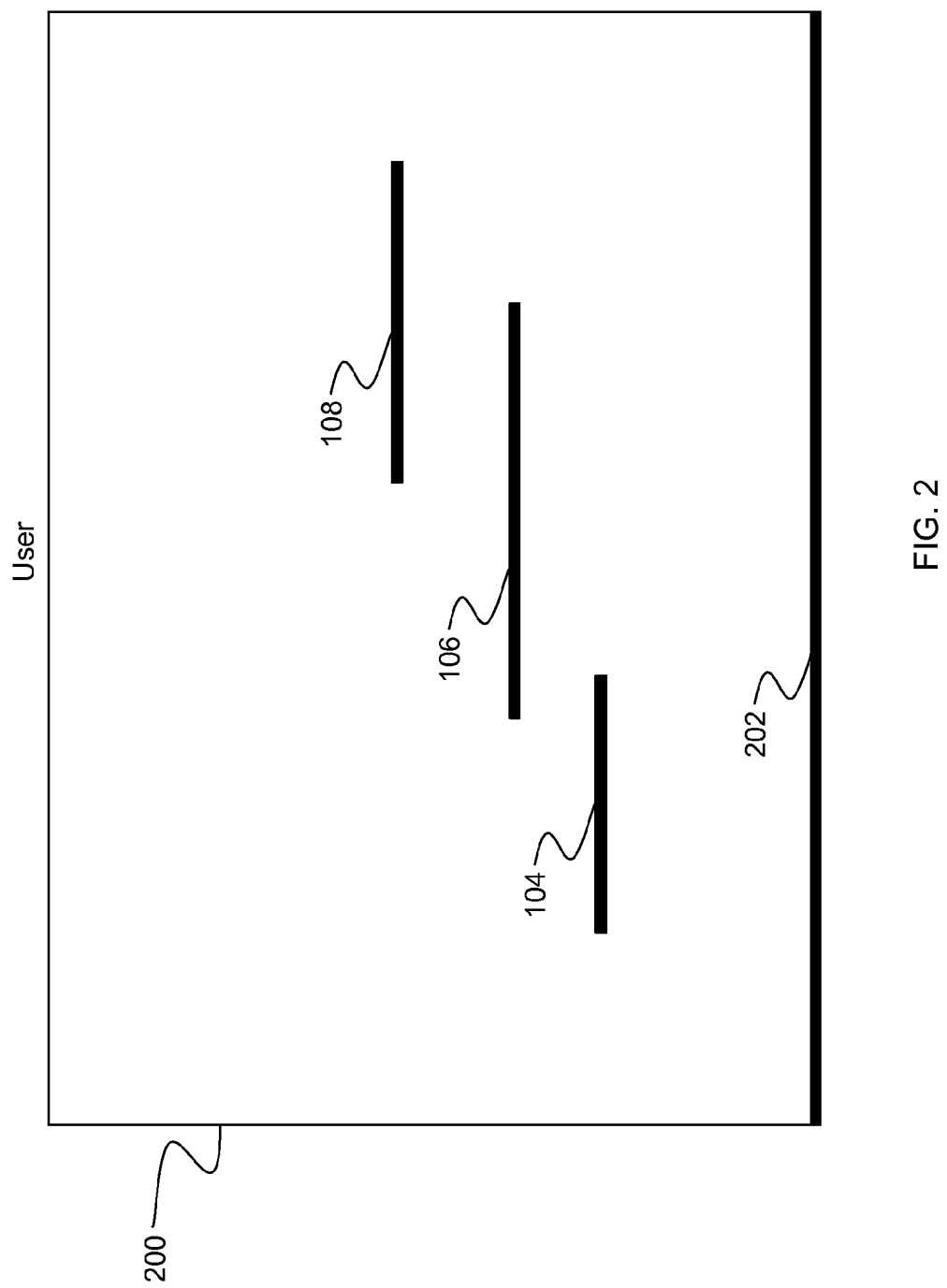
FIG. 2 illustrates an example elevation view of the graphical interface of FIG. 1.

FIG. 2 illustrates an example elevation view 200 of graphical interface 100 of FIG. 1. In some implementations, windows 104-108 can be displayed according to a z-order. For example, each window 104-108 can be associated with a z-order value that can be used to determine how to display each window relative to the other windows in workspace 102 and perpendicular to desktop 202. In other words, the z-order value can be used to determine the relative elevations of each window above desktop 202 (e.g., between the user and desktop 202). For example, desktop 202 can have a z-order value of zero, window 104 can have a z-order value of one, window 106 can have a z-order value of two and window 108 can have a z-order value of three. Thus, when graphical user interface 100 is rendered with windows 104-108, windows 104-108 can be displayed according to their respective z-order values. In some implementations, the higher the z-order value, the closer the window is to the user and the farther the window is from the desktop. In some implementations, the higher the z-order value, the closer the window is to the desktop and the farther the window is from the user.

In some implementations, the z-order for windows 104-108 is workspace specific. For example, the z-order (e.g., the display order) for windows within workspace 102 can be determined independently of windows associated with other workspaces.

Displaying Windows According to a Global Z-Order

Figure 3:
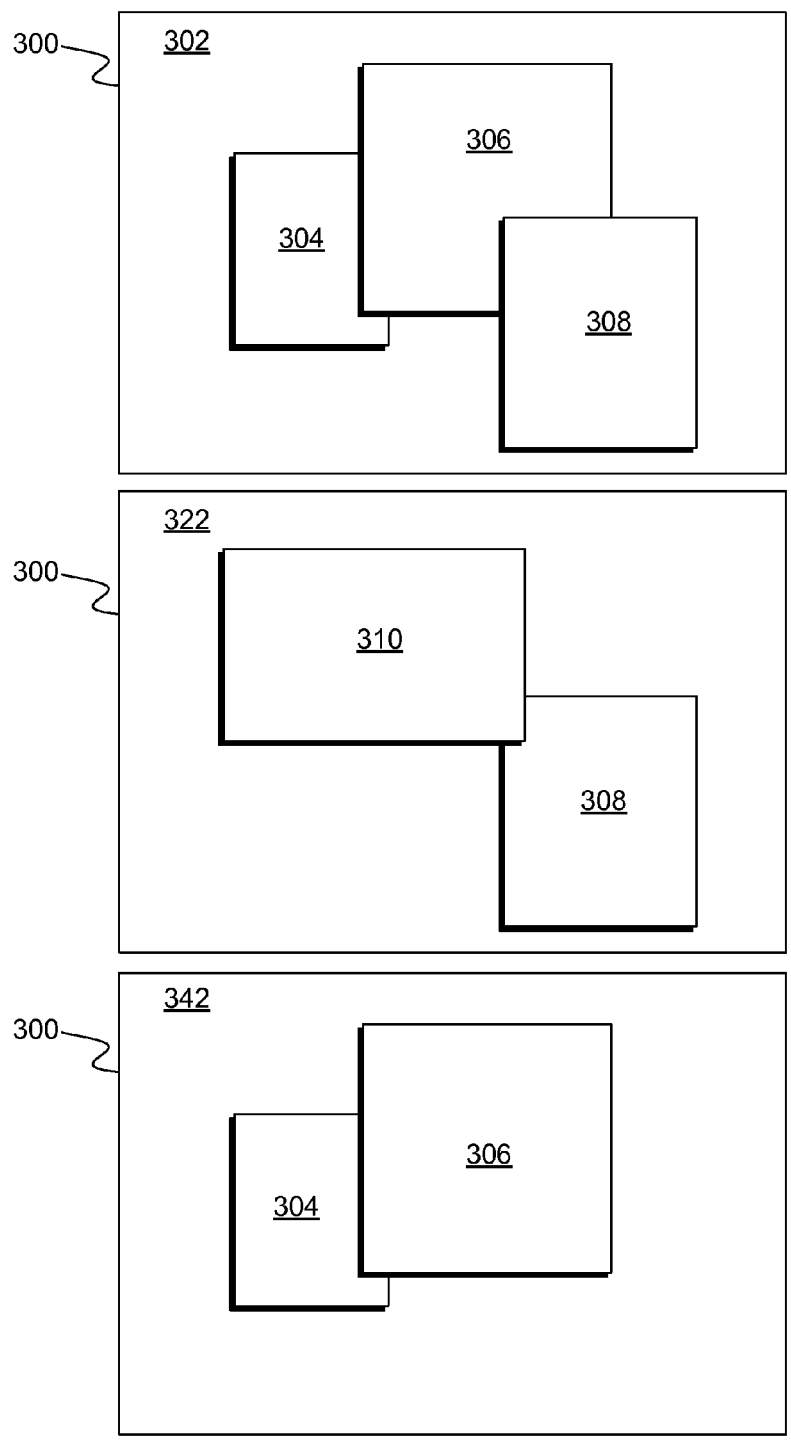
FIG. 3 illustrates an example graphical interface for displaying multiple workspaces.

FIG. 3 illustrates an example graphical interface 300 for displaying multiple workspaces. Graphical interface 300 can be an interface of a computing device. For example, graphical interface 300 can be an interface of a desktop computer, laptop computer, smartphone, tablet computer or other computing device. In some implementations, graphical interface 300 can display workspaces 302, 322 and 342.

In some implementations, each workspace can be associated with one or more windows. Workspace 302 can be associated with windows 304-308, for example. Workspace 322 can be associated with windows 308 and 310. Workspace 342 can be associated with windows 304 and 306. A window can be associated with one workspace, many workspaces, all workspaces, or no workspaces, for example. In some implementations, graphical interface 300 can switch between workspaces 302, 322 and 342. For example, a user can provide input to cause graphical interface 300 to switch between displaying workspace 302 (e.g., windows 304-308), displaying workspace 322 (e.g., windows 308 and 310) and displaying workspace 342 (e.g., windows 304 and 306).

In some implementations, the windows associated with each workspace can be displayed based on a global z-order (e.g., a system-wide z-order for windows). For example, instead of ordering windows according to workspace (e.g., a workspace z-order), every window in every workspace (e.g., visible or hidden) can be included in the global z-ordering. In some implementations, windows 304-310 can each be associated with a global z-order value (e.g., array index, position in list, assigned value, etc.). For example, window 304 can be assigned a global z-order value of one, window 306 can be assigned a global z-order value of two, window 308 can be assigned a global z-order value of three and window 310 can be assigned a global z-order value of four. The global z-order value can be used to determine the global z-order of windows across all workspaces. In some implementations, the global z-order can include both visible and hidden windows. For example, if workspace 302 is displayed and workspaces 322 and 342 are hidden, the global z-order can include windows 304-310 even though window 310 is hidden with hidden workspace 322. Thus, as a user switches between visible and hidden workspaces, the relative display order of windows in each workspace can be maintained thereby presenting a consistent and predictable window display ordering.

In some implementations, the global z-order can be updated as windows are manipulated within a workspace. For example, if workspace 302 is displayed and a user selects window 304, window 304 can be moved above windows 306 and 308 in workspace 302. When window 304 is selected, the global z-order of windows can be updated to reflect the movement of window 304. For example, window 304 can be assigned a global z-order value of four, window 310 can be assigned a global z-order value of three, window 308 can be assigned a global z-order value of two and window 306 can be assigned a global z-order value of one in response to the selection of window 304. Thus, when workspace 342 is subsequently displayed, window 304 can be displayed above window 306 based on the adjusted global z-order, for example.

Figure 4:
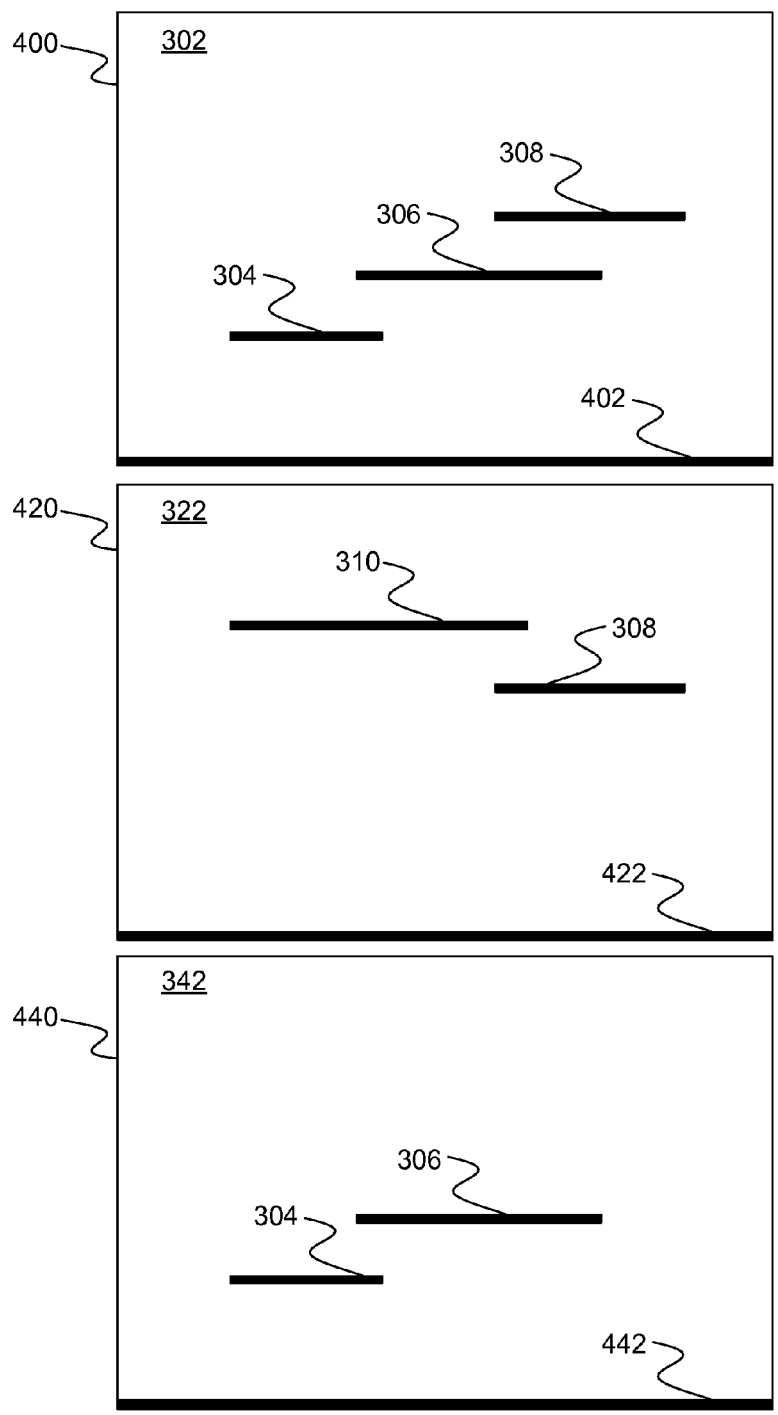
FIG. 4 illustrates example elevation views of the workspaces of FIG. 3.

FIG. 4 illustrates example elevation views 400, 420 and 440 of the workspaces of FIG. 3. For example, elevation view 400 illustrates the global z-ordering of windows 304, 306 and 308 within workspace 302 and above desktop 402. Elevation view 420 illustrates the global z-ordering of windows 308 and 310 within workspace 322 and above desktop 402. Elevation view 440 illustrates the global z-ordering of windows 304 and 306 within workspace 342 and above desktop 402, for example. As illustrated by elevation views 400, 420 and 440, the relative z-positions of windows 304, 306, 308 and 310 are maintained across workspaces 302, 322 and 342 and according to the global z-order for windows.

Simultaneously Displaying Multiple Workspaces

Figure 5:
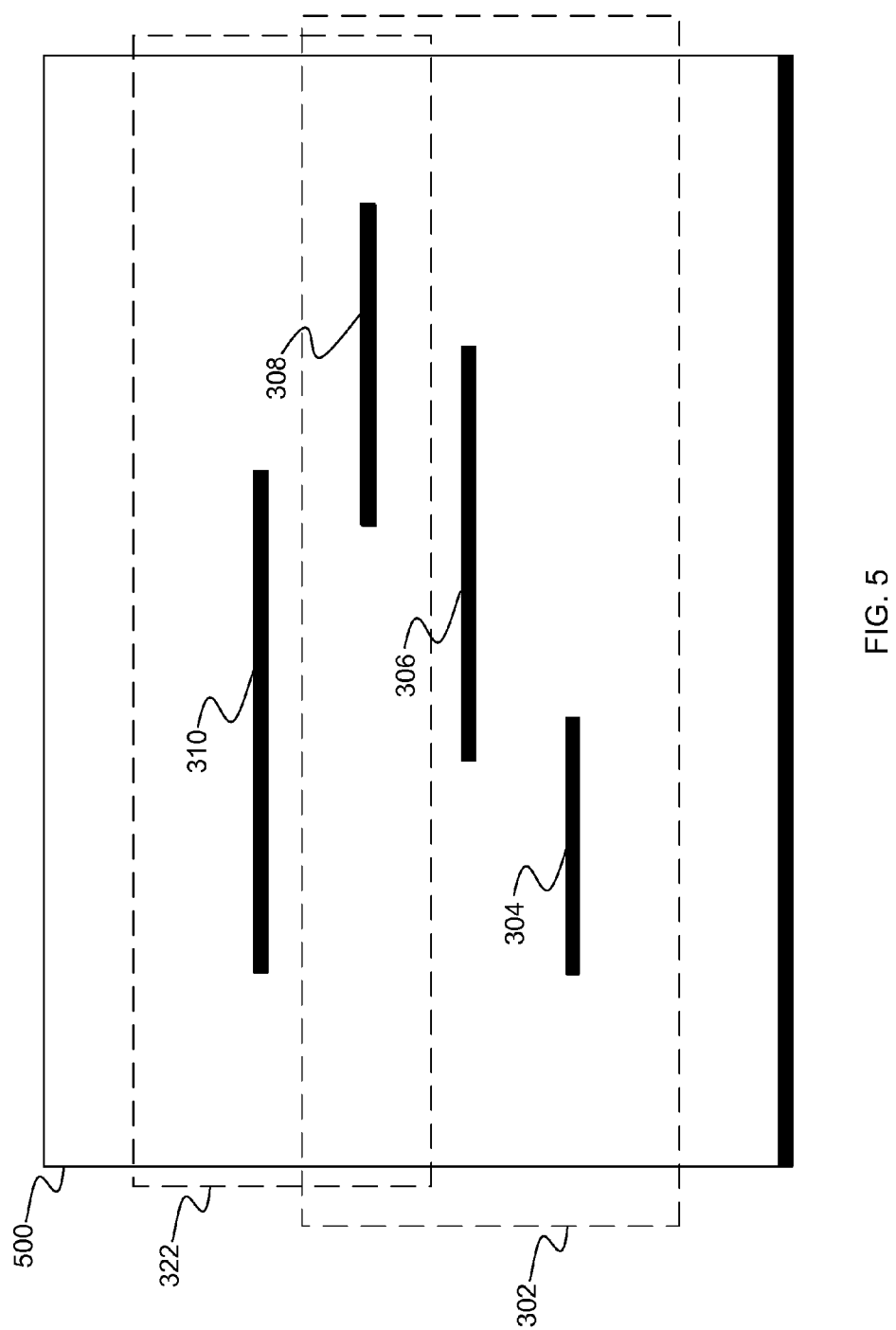
FIG. 5 illustrates an example graphical interface for simultaneously displaying workspaces.

FIG. 5 illustrates an example elevation view 500 of a graphical interface simultaneously displaying multiple workspaces. In some implementations, multiple workspaces can be displayed simultaneously. For example, workspace 322 and workspace 302 can be displayed simultaneously within the same display space. In some implementations, when workspace 322 and 302 are displayed simultaneously, the union set of the windows in both workspaces can be determined. The union set of windows can be displayed in the display area. For example, workspace 322 can include windows 308 and 310. Workspace 302 can include windows 304, 306 and 308. Thus, the union set of windows from workspace 302 and workspace 322 includes windows 304, 306, 308 and 310. By determining and displaying only the union set of windows, window 308 will not be displayed twice (e.g., window 308 is in workspace 302 and 322).

Figure 6:
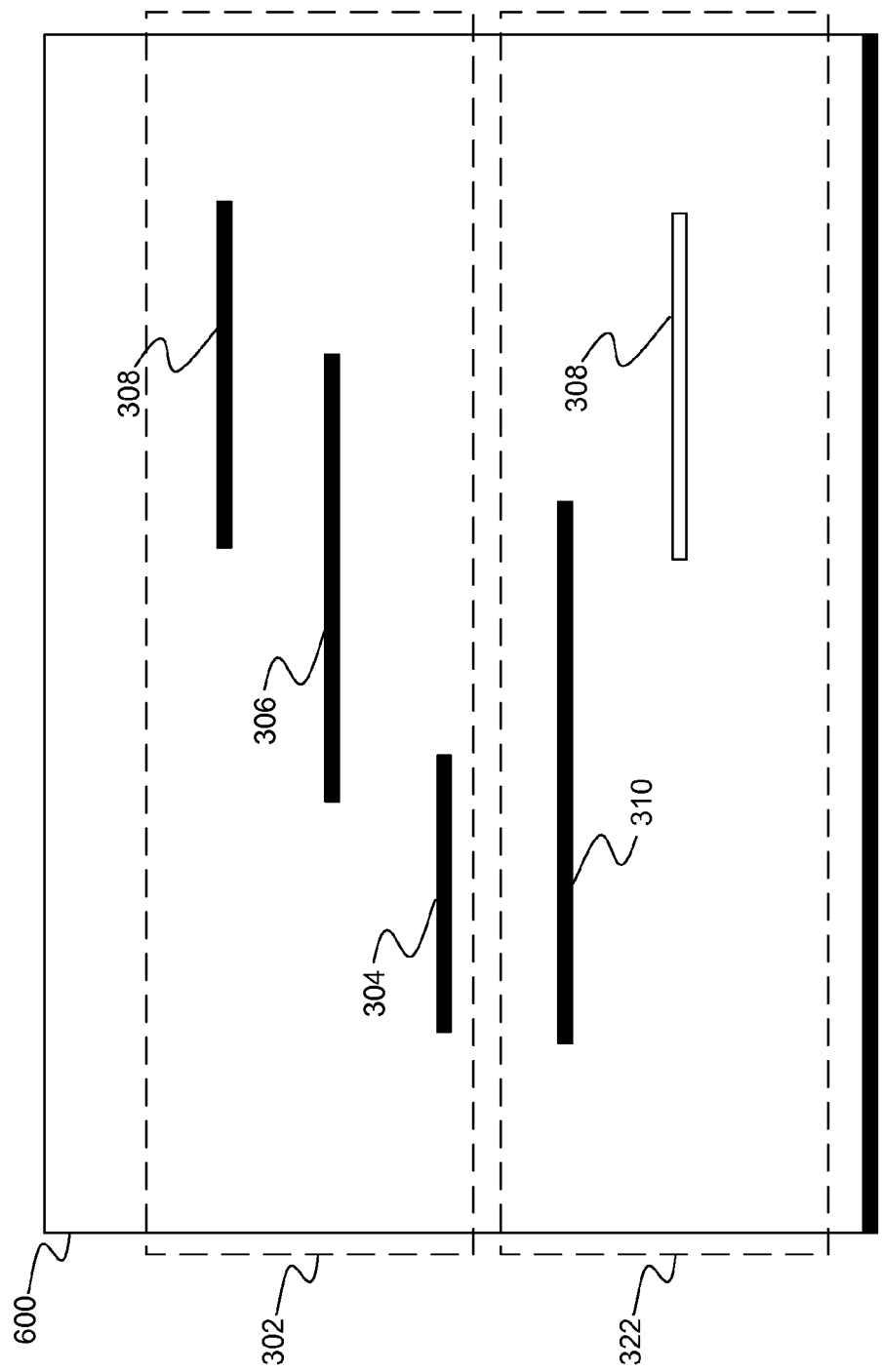
FIG. 6 illustrates an example graphical interface for simultaneously displaying workspaces having different levels.

FIG. 6 illustrates an example elevation view 600 of a graphical interface for simultaneously displaying workspaces having different levels. In some implementations, workspaces can be assigned a level. For example, if workspace 302 and workspace 304 are associated with the same level and are displayed simultaneously, the windows of workspace 302 and workspace 304 can be displayed according to FIG. 5.

In some implementations, workspaces can be associated with different levels. For example, workspace 302 can have a workspace level of one and workspace 322 can have a workspace level of zero. Thus, based on the assigned workspace level, workspace 302 can be determined to be at a higher (or lower) level than workspace 322. In some implementations, when workspace 302 has a higher workspace level than workspace 322, workspace 302 can be displayed overlaid on workspace 322, as illustrated by FIG. 6. For example, the windows of workspace 302 (e.g., windows 304, 306 and 308) can be displayed over the windows of workspace 322 (e.g., windows 308 and 310). Thus, even though window 310 has a higher global z-order value (e.g. four) than windows 304-308 (one through three, respectively), window 310 is displayed beneath windows 304-308 because windows 304-308 are associated with workspace 302 which has a higher workspace level than workspace 322 with which window 310 is associated.

In some implementations, windows associated with a higher level workspace are given priority. For example, when multiple workspaces are displayed simultaneously, the union set of windows from the displayed workspaces is determined and displayed. Thus, when displaying workspace 302 and workspace 322, window 308 is only displayed once even though window 308 is in both workspaces. However, as illustrated by FIG. 6, window 308 can be displayed at two different z-positions (e.g., filled 308, unfilled 308) based on the global z-order of window 308 and the relative z-position of window 308 within workspace 302 and workspace 322.

In some implementations, when a window is associated with multiple simultaneously displayed workspaces having different workspace levels, the window can be displayed based on the workspace having the highest level. Thus, because workspace 302 has a higher level than workspace 322, window 308 will be displayed according to its relative z-position (e.g., filled 308) within workspace 302 (the higher level workspace) and window 308 will not be displayed according to its z-position (e.g., unfilled 308) within workspace 322. In this manner, every window associated with workspaces 302 and 322 can be displayed and the windows of workspace 302 can be given a higher priority than (e.g., displayed above) the windows of workspace 322 based on the higher workspace level assigned to workspace 302. It should be noted here that the windows within workspace 302 and workspace 322 are displayed according to the global z-order for windows. However, the workspace level assigned to each workspace can cause windows of a higher level workspace to be displayed above windows of a lower level workspace causing it to appear that the windows are displayed contrary to or differently than what is specified by the global z-order for windows, as illustrated by FIG. 6.

Hiding and Showing Workspaces—Workspace Overlays

In some implementations, workspaces can be dynamically overlaid upon other workspaces. For example, referring to FIG. 6, workspace 322 can be displayed while workspace 302 is hidden from view. When only workspace 322 is displayed, only windows 308 and 310 will be visible and windows 308 and 310 will be displayed according to the global z-order for windows within workspace 322.

In some implementations, a user can provide input to cause workspace 302 to be displayed. For example, workspace 302 can be displayed as a temporary overlay above workspace 322. Workspace 302 can be overlaid upon workspace 322 by assigning workspace 302 a higher workspace level than the workspace level of workspace 322. When workspace 302 is overlaid upon workspace 322, the windows of the workspaces (e.g., windows 308-310) will be displayed according to the workspace levels assigned to the workspaces and the global z-order for windows, as described above with reference to FIG. 6.

In some implementations, the user can provide input to remove the workspace overlay. For example, responsive to user input, workspace 302 can be hidden leaving only workspace 322 displayed. When workspace 302 is hidden, only windows 308 and 310 will remain displayed, for example.

Clipping Windows to Workspaces

Figure 7:
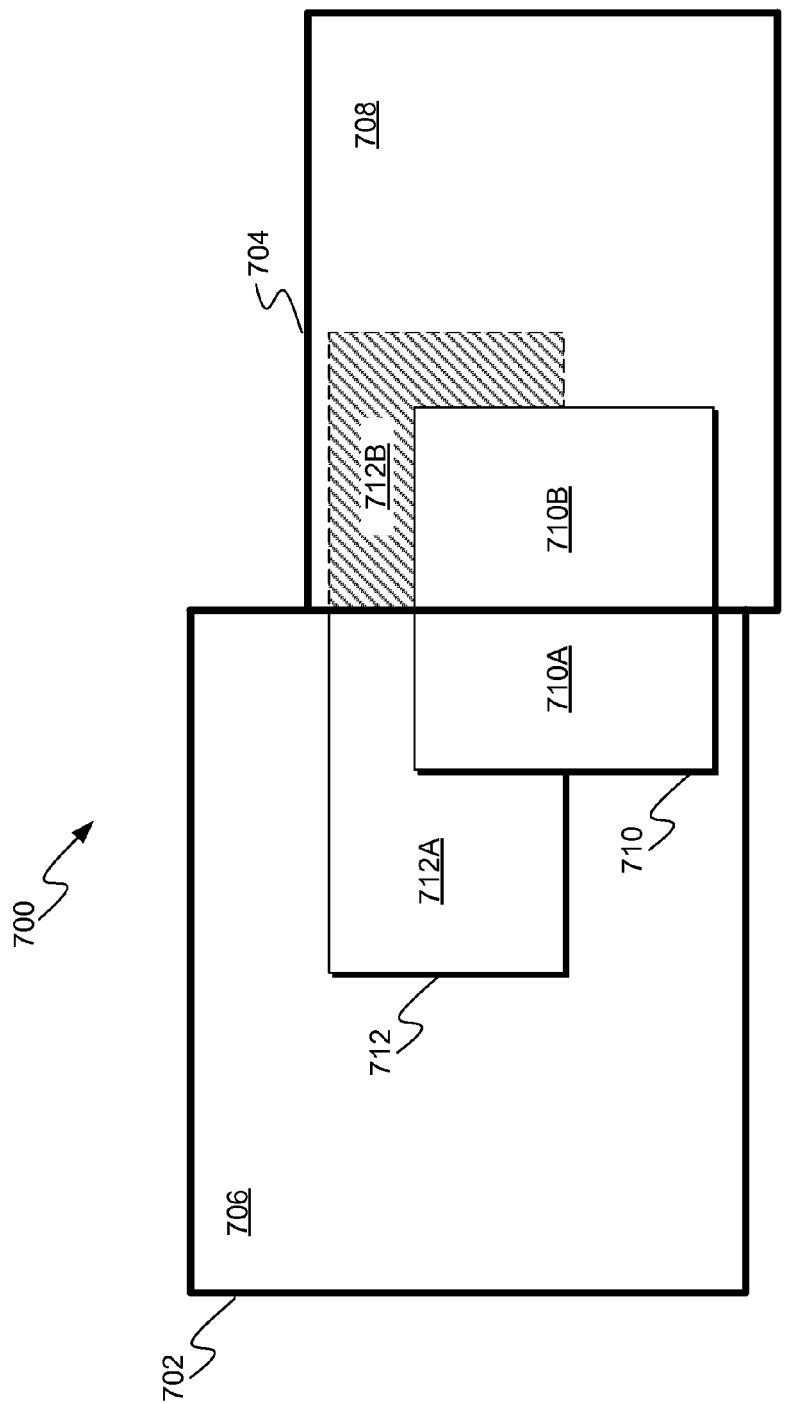
FIG. 7 illustrates an example multiple display system for displaying workspaces.

FIG. 7 illustrates an example multiple display system 700 for displaying workspaces. For example, system 700 can include display devices 702 and 704. In some implementations, a workspace can be assigned to a particular display device. For example, workspace 706 can be assigned to display device 702. Workspace 708 can be assigned to display device 704. As described above, workspaces can be associated with windows. For example, workspace 706 can be associated with windows 710 and 712. Workspace 708 can be associated with window 710.

In some implementations, a union set of windows can be determined for the displayed workspaces. For example, to avoid displaying window 710 twice, the union set of windows associated with workspace 706 (e.g., windows 710 and 712) and workspace 708 (e.g., window 710) can be determined. Thus, only one window 710 and one window 712 will be displayed in multiple display system 700. However, as described below, windows will only be displayed in workspaces with which the windows are associated. For example, window 710 can be displayed on display device 702 and 704 while window 712 will only be displayed on display device 702. Thus, window 712 will be clipped to (e.g., restricted to, cropped to) the display area associated with workspace 706.

In some implementations, a window that belongs to workspaces associated with two or more displays can be positioned based on which display corresponds to the main display. For example, window 710 is associated with workspace 706 and workspace 708. However, only one instance of window 710 can be displayed. System 700 may need to determine whether to display window 710 in workspace 706 or workspace 708. To make this determination, the system can determine which workspace is associated with the main display (e.g., display device 702) and display window 710 in that workspace. For example, the main display can be identified by the user in the system preferences of system 700. In some implementations, if workspaces 706 and 708 have different workspace levels, window 710 can be displayed in the workspace having the higher level.

In some implementations, windows can be displayed in multiple display system 700 based on the associations between windows and workspaces. A window can be displayed on a display device that is associated with a workspace with which the window is associated. For example, window 710 can be displayed on display device 702 and/or display device 704 because window 710 is associated with workspace 706 and workspace 708. If window 710 is positioned such that window portion 710B is moved off the edge of display device 702 (e.g., window portion 710A remains on display device 702), window portion 710B can be displayed on display device 704 because window 710 is associated with workspace 708. Thus, if a window is associated with workspaces on each display device, the window can be displayed on any display device.

In some implementations, windows can be displayed across multiple display devices only if the window belongs to the workspaces associated with each display device. For example, window 712 is only associated with workspace 706 (e.g., display device 702). Window 712 is not associated with workspace 708 (e.g., display device 704). Thus, when window 712 is positioned such that window portion 712B is moved off the edge of display device 702 (e.g., window portion 712A remains on display device 702), window portion 712B will be clipped to the display area associated with workspace 706. For example, window portion 712B will not be displayed on display device 704 because window 712 is not associated with workspace 708.

Operations on Workspaces

In some implementations, workspace-window associations are maintained for both visible and hidden workspaces. For example, by maintaining workspace-window associations various operations can be performed on workspaces and the windows of the workspaces as a group. For example, instead of performing operations on each individual window in a workspace, the workspace as a whole (including each window in the workspace) can be operated upon. Moreover, if an operation has been performed on a workspace, the operation can be applied to windows added to the workspace in the future. For example, if the opacity or transparency of the workspace has been adjusted, the opacity or transparency adjustment can be applied to all windows associated with the workspace. If windows are added to the workspace after the opacity adjustment has been made, the workspace adjustments can be applied to the added windows. If windows are removed from the workspace, the workspace adjustments will no longer be applied to the windows.

In some implementations, workspace transforms can be performed. For example, the workspace (including the windows associated with the workspace) can be moved, scaled, rotated, etc., as a whole thereby simplifying the transformation process. In some implementations, workspace transparency or opacity can be adjusted. For example, the transparency or opacity of a workspace (including the windows associated with the workspace) can be adjusted as a whole thereby simplifying the adjustment process.

Example Process

Figure 8:
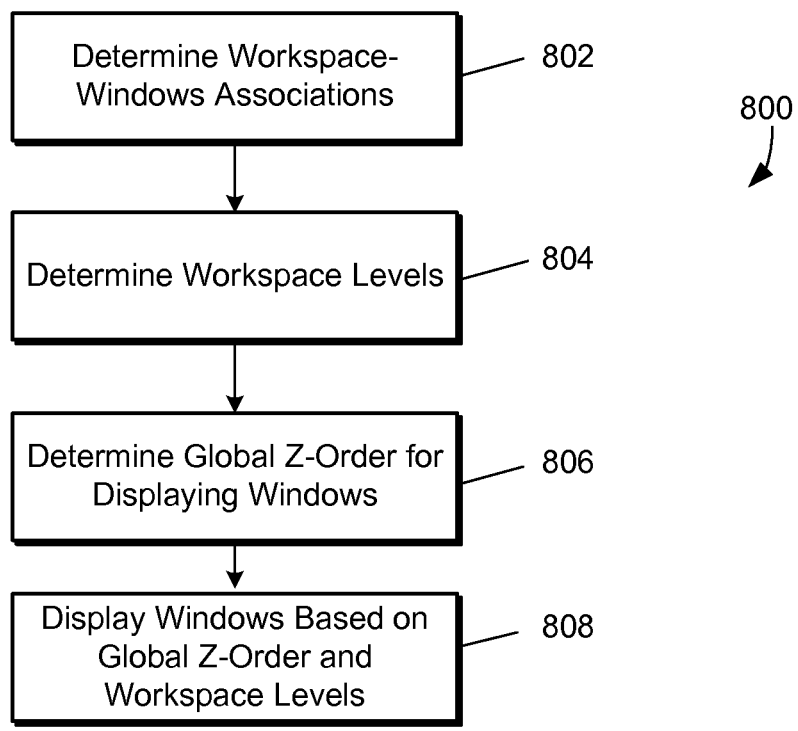
FIG. 8 is a flow diagram of an example process for displaying windows based on global z-order.

FIG. 8 is a flow diagram of an example process for displaying windows based on global z-order. At step 802, workspace to window associations can be determined. In some implementations, windows can be associated with workspaces based on user input. For example, a user can invoke an application window in a particular workspace causing the application window to be associated with the particular workspace. A user can assign a window to a workspace. For example, a user can specify which workspaces a window should be associated with. A user can assign applications to a workspace. For example, a user can specify that windows invoked for a particular application should be displayed in a particular workspace.

In some implementations, each workspace can be associated with a workspace data structure that can store information that identifies the windows that belong to the workspace. This workspace data structure can maintain the workspace to windows association even when a workspace (and its associated windows) is not currently displayed. As each window is opened and associated with a workspace, the workspace data structure can store and maintain the workspace to windows associations.

At step 804, workspace levels can be determined. In some implementations, workspaces levels can be assigned by a user. For example, a user may have a favorite workspace and assign that workspace a high workspace level. In some implementations, workspace levels can be assigned dynamically. For example, if a user invokes a workspace overlay, the invoked workspace can be dynamically assigned a workspace level that is high enough to ensure that the invoked workspace will be displayed over any currently displayed workspaces. The workspace level can be maintained in the workspace data structure described above.

At step 806, a global z-order for windows can be determined. In some implementations, a data structure (e.g., array, list, etc.) can be maintained that represents the global z-order for windows across workspaces. This global z-order data structure can be referenced to determine how to display windows for each workspace. As windows are moved and z-positions adjusted, the global z-order data structure can be updated to represent the changed z-order for windows.

At step 808, windows can be displayed based on the global z-order for windows and the workspace levels. For example, when one or more workspaces are displayed, the windows associated with the workspaces can be displayed according to the global z-order for windows and the workspace levels, as described above with reference to FIGS. 3-7. For example, by displaying windows in different workspaces according to a common system wide z-order (e.g., global z-order), a more consistent multi-workspace window display can be achieved that provides a less confusing windows display for the user.

Example Data Structures

Figure 9:
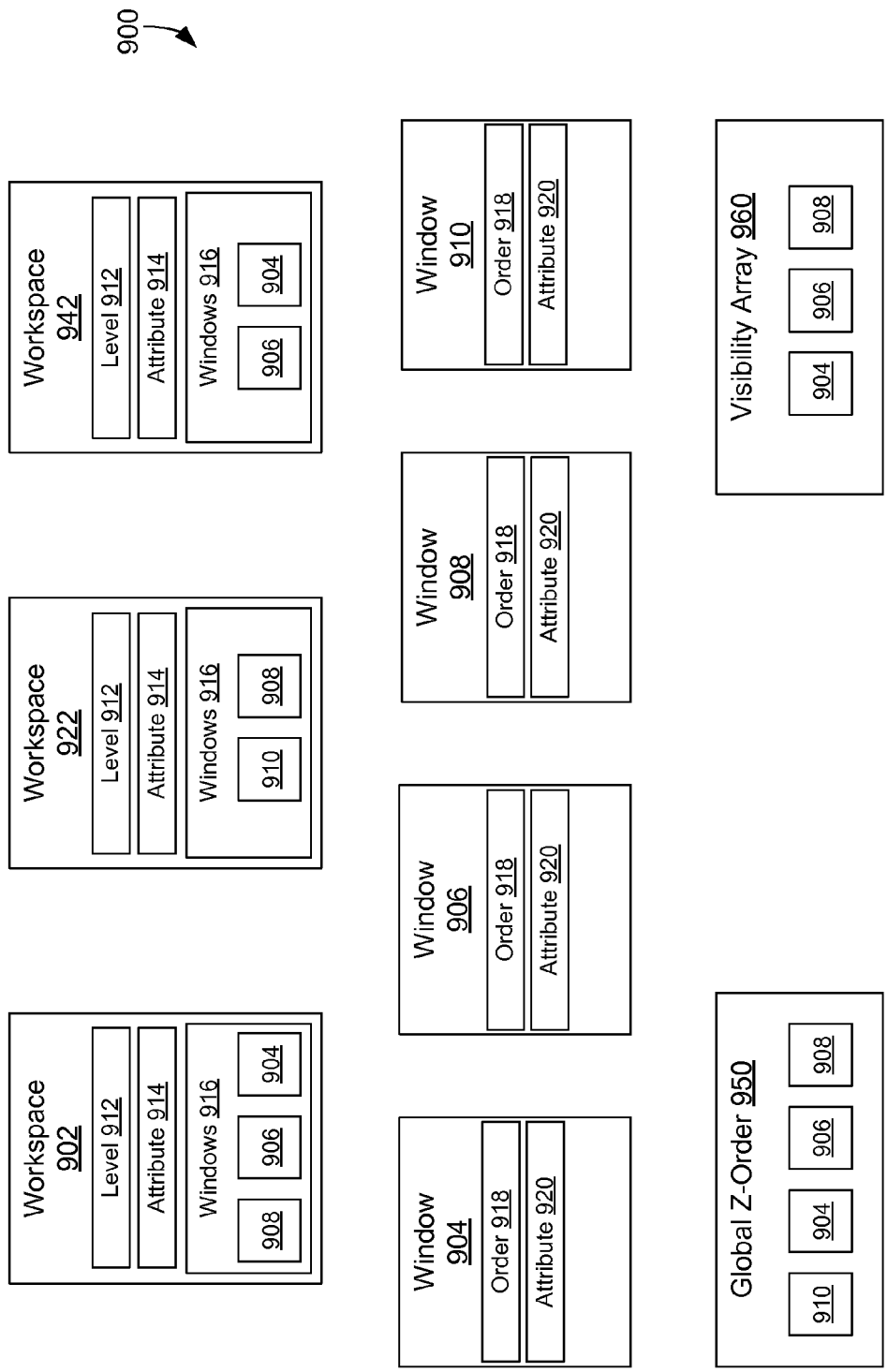
FIG. 9 illustrates example data structures for implementing global z-order for windows.

FIG. 9 illustrates example data structures 900 for implementing global z-order for windows. In some implementations, each workspace can be represented by a workspace object. For example, workspace objects 902, 922 and 942 can each represent a workspace. Each workspace can have one or more attributes, such as a workspace level 912 and other attributes 914 (e.g., opacity, transparency, scale, etc.). For example, workspace level 912 can indicate a z-position of a workspace relative to other workspaces, as described above. The attributes of each workspace can be applied to each window associated with the workspace. For example, if a workspace has an opacity attribute, the opacity attribute value can be applied to each window associated with the workspace.

Each workspace object can be associated with one or more windows 916. For example, workspace object 902 can be associated with windows 908, 906 and 904. Workspace object 922 can be associated with windows 910 and 908. Workspace object 942 can be associated with windows 906 and 904. In some implementations, windows can be represented by window objects 904, 906, 908 and 910. Each window object can have attributes, such as an order attribute 918 and other attributes 920 (e.g., opacity, size, orientation, etc.). The order attributes can store a value that indicates the z-position of a window relative to other windows.

In some implementations, global z-order object 950 can maintain the relative order for all windows across all workspaces. For example, global z-order object 950 can be associated with a linked list, array, or other ordered collection that indicates the global z-order for all windows. In some implementations, visibility array 960 can be associated with a linked list, array, or other ordered collection that indicates the global z-order for all visible windows.

In some implementations, global z-order object 950 can maintain the global z-order for windows. For example, if global z-order object 950 maintains the global z-order of windows using a linked list, the windows can be ordered first to last, top to bottom in the linked list. If global z-order object 950 maintains the global z-order for windows using an array, the position of the window within the array can indicate the relative z-position of the window.

In some implementations, when a user causes one or more workspaces to be displayed, the windows can be ordered based on the global z-order maintained by the global z-order object 950. For example, if a user selects workspace 902 for display, the order attribute 918 for all windows can be initially set to negative one (−1). Negative one can indicate that a window should not be displayed. Then, each window associated with workspace 902 (e.g., the workspace to be displayed) can be assigned an order based on the global z-order maintained by global z-order object 950. For example, workspace 902 includes windows 908, 906 and 904. Thus, windows 908, 906 and 904 can be assigned an order value corresponding to their relative positions within the global z-order object 950. For example, windows 908, 906 and 904 can be ordered 904, 906, 908. Window object 904 can have an order attribute value of one. Window object 906 can have an order attribute value of two. Window object 906 can have an order attribute value of three. Each order attribute value can correspond to the position of the window in the global z-order object 950.

Once order attribute values are assigned to each window object, the window objects can be assigned to the visibility array 960 based on the order attribute values. For example, each window having an order attribute value greater than negative one can be assigned to the visibility array. Since order attribute values greater than negative one will only be assigned to visible windows, only the visible windows will be included in visibility array object 960. Once the visible windows are added to visibility array object 960, the windows can be sorted according to their respective order attributes. The visibility array 960, including the ordered windows, can then be provided as input to the system's compositor (e.g., windows manager) for rendering onto the system's display.

In some implementations, multiple workspaces can be displayed simultaneously. For example, workspace 902 and 922 can be displayed simultaneously causing windows 904-910 to be displayed. If workspace 902 and workspace 922 are associated with the same workspace level (e.g., have the same level attribute value), then the ordering and displaying of windows can be performed as described above.

In some implementations, workspaces can be associated with different levels. For example, workspace 902 can be associated with a level (e.g., level zero) that is higher than workspace 922 (e.g., level one). To account for the different workspace levels, the order attribute of the windows associated with each workspace can be adjusted based on the workspace level. For example, if windows are ordered zero to N (highest to lowest), and workspaces are ordered zero to N (highest to lowest), then order attribute value for windows associated with workspace 902 can be the order values specified by the global z-order object 950 and the order attribute value for windows associated with workspace 922 can be adjusted such that the windows of workspace 922 are all below the windows associated with workspace 902. Once the order attribute values for each window is adjusted to account for workspace level, the visible windows can be assigned to visibility array object 960 and provided as input to the system's compositor for rendering on a display device.

Example System Architecture

Figure 10:
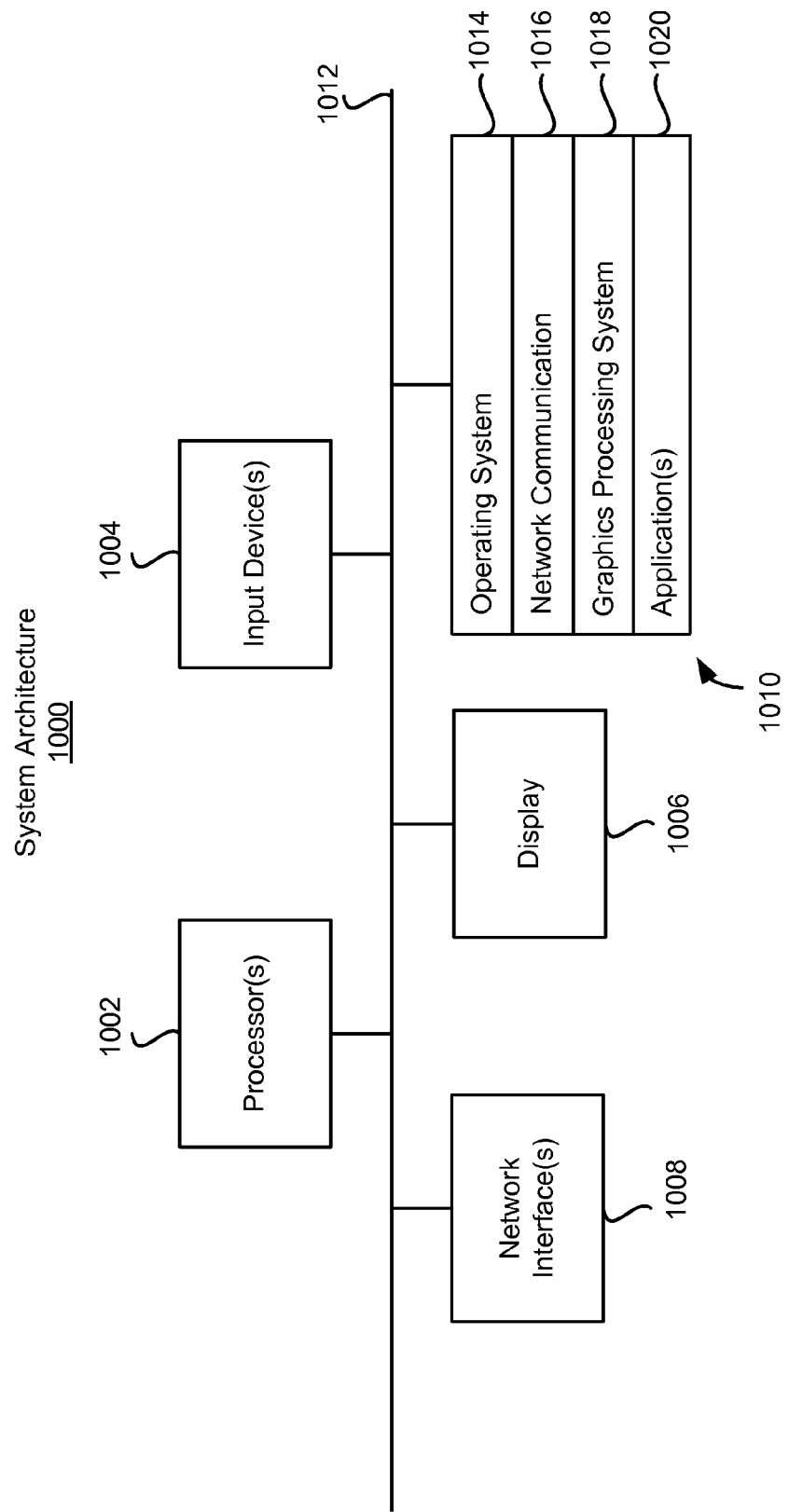
FIG. 10 is a block diagram of an exemplary system architecture implementing the features and processes of FIGS. 1-9.

FIG. 10 is a block diagram of an exemplary system architecture implementing the features and processes of FIGS. 1-9. The architecture 1000 can be implemented on any electronic device that runs software applications derived from compiled instructions, including without limitation personal computers, servers, smart phones, media players, electronic tablets, game consoles, email devices, etc. In some implementations, the architecture 1000 can include one or more processors 1002, one or more input devices 1004, one or more display devices 1006, one or more network interfaces 1008 and one or more computer-readable mediums 1010. Each of these components can be coupled by bus 1012.

Display device 1006 can be any known display technology, including but not limited to display devices using Liquid Crystal Display (LCD) or Light Emitting Diode (LED) technology. Processor(s) 1002 can use any known processor technology, including but are not limited to graphics processors and multi-core processors. Input device 1004 can be any known input device technology, including but not limited to a keyboard (including a virtual keyboard), mouse, track ball, and touch-sensitive pad or display. Bus 1012 can be any known internal or external bus technology, including but not limited to ISA, EISA, PCI, PCI Express, NuBus, USB, Serial ATA or FireWire. Computer-readable medium 1010 can be any medium that participates in providing instructions to processor(s) 1002 for execution, including without limitation, non-volatile storage media (e.g., optical disks, magnetic disks, flash drives, etc.) or volatile media (e.g., SDRAM, ROM, etc.).

Computer-readable medium 1010 can include various instructions 1014 for implementing an operating system (e.g., Mac OS®, Windows®, Linux) and/or application (e.g., software program). The operating system can be multi-user, multiprocessing, multitasking, multithreading, real-time and the like. The operating system performs basic tasks, including but not limited to: recognizing input from input device 1004; sending output to display device 1006; keeping track of files and directories on computer-readable medium 1010; controlling peripheral devices (e.g., disk drives, printers, etc.) which can be controlled directly or through an I/O controller; and managing traffic on bus 1012. Network communications instructions 1016 can establish and maintain network connections (e.g., software for implementing communication protocols, such as TCP/IP, HTTP, Ethernet, etc.).

A graphics processing system 1018 can include instructions that provide graphical user interface processing capabilities. For example, the graphics processing system 1018 can implement the processes described with reference to FIGS. 1-9 and can include a compositor or windows manager for causing windows to be displayed based on the global z-order for windows. Application(s) 1020 can be an application that uses or implements the processes described in reference to FIGS. 1-9. The processes can also be implemented in operating system 1014.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
   at a computing device with a display and one or more input devices:
   displaying, on the display, a first workspace including a first window at least partially obscuring a first portion of a first instance of a second window, the first portion at a first relative location in the first instance of the second window, according to a relationship between respective z-order values of a global z-order associated with the first and second windows,
   wherein a second workspace includes a third window at least partially obscuring a second portion of a second instance of the second window, the second portion at a second relative location in the second instance of the second window, different from the first relative location, according to a relationship between respective z-order values of the global z-order associated with the second and third windows;
   while displaying, on the display, the first workspace, receiving, via the one or more input devices, an input associated with the second window; and
   in response to receiving the input, in accordance with a determination that the input corresponds to a request to promote the z-order value associated with the second window with respect to the z-order value associated with the first window in the global z-order:
   modifying the global z-order in accordance with the input;
   updating the first workspace such that the first portion of the first instance of the second window at least partially obscures the first window in the first workspace; and
   updating the second workspace such that the second portion of the second instance of the second window at least partially obscures the third window in the second workspace.

2. The method of claim 1, further comprising:
   hiding one of the first window, the first instance of the second window, the second instance of the second window, and the third window while maintaining the one window in the global z-order.

3. The method of claim 2, further comprising:
   receiving input associated with the one window;
   in response to the input associated with the one window and in accordance with a determination that the input associated with the one window corresponds to a request to display the one window:
   displaying the one window in accordance with the global z-order.

4. The method of claim 1, wherein a first set of windows including the first window is associated with the first workspace, the method further comprising:
   receiving input associated with the first set of windows;
   in response to receiving the input associated with the first set of windows, in accordance with a determination that the input corresponds to a request to promote the first set of windows with respect to the second window:
   modifying the global z-order in accordance with the input to promote the first set of windows with respect to the second window while preserving a relative ordering of the windows of the first set of windows according to respective z-order values associated with the windows of the first set of windows prior to receiving the input associated with the first set of windows; and
   displaying the first set of windows in the first workspace according to the relative ordering of the windows of the first set of windows, wherein the windows of the first set of windows at least partially obscure the first instance of the second window according to the relationship between respective z-order values of the global z-order associated with the windows of the first set of windows and the second window.

5. The method of claim 1, wherein the first window is associated with a first application and the third window is associated with a second application, different from the first application.

6. The method of claim 1, wherein the first workspace is associated with a first level and the second workspace is associated with a second level that is higher than the first level, and
   the first window is above the third window according to the relationship between respective z-order values of the global z-order associated with the first and third windows,
   the method further comprising displaying the first window and the third window based on the first level and the second level.

7. The method of claim 6, further comprising:
   displaying the third window at least partially obscuring the first window in accordance with the second level being higher than the first level.

8. The method of claim 1, wherein a first set of windows including the first window is associated with the first workspace, and a second set of windows including the third window is associated with the second workspace, the method further comprising:
   determining a union set of the first set of windows and the second set of windows; and
   displaying the union set of windows according to the relationship between respective z-order values of the global z-order associated with the respective windows of the union set of windows.

9. The method of claim 1, further comprising:
while displaying the first workspace, receiving an input associated with the first window;
in response to receiving the input associated with the first window, and in accordance with a determination that the input corresponds to a request to dissociate the first window from the first workspace and associate the first window with the second workspace, disassociating the first window from the first workspace and associating the first window with the second workspace while maintaining the first window in the global z-order, wherein the second instance of the second window at least partially obscures the first window in the second workspace according to a relationship between respective z-order values of the global z-order associated with the first and second windows.

10. The method of claim 1, wherein the first, second, and third windows have different positions in the global z-order.

11. A non-transitory computer-readable medium including one or more sequences of instructions which, when executed by one or more processors of a computing device with a display and one or more input devices, cause the one or more processors to perform a method comprising:
displaying, on the display, a first workspace including a first window at least partially obscuring a first portion of a first instance of a second window, the first portion at a first relative location in the first instance of the second window, according to a relationship between respective z-order values of a global z-order associated with the first and second windows,
wherein a second workspace includes a third window at least partially obscuring a second portion of a second instance of the second window, the second portion at a second relative location in the second instance of the second window, different from the first relative location, according to a relationship between respective z-order values of the global z-order associated with the second and third windows;
while displaying, on the display, the first workspace, receiving, via the one or more input devices, an input associated with the second window; and
in response to receiving the input, in accordance with a determination that the input corresponds to a request to promote the z-order value associated with the second window with respect to the z-order value associated with the first window in the global z-order:
modifying the global z-order in accordance with the input;
updating the first workspace such that the first portion of the first instance of the second window at least partially obscures the first window in the first workspace; and
updating the second workspace such that the second portion of the second instance of the second window at least partially obscures the third window in the second workspace.

12. The computer-readable medium of claim 11, where the instructions cause:
hiding one of the first window, the first instance of the second window, the second instance of the second window, and the third window while maintaining the one window in the global z-order.

13. The computer-readable medium of claim 12, where the instructions cause:
receiving input associated with the one window;
in response to the input associated with the one window and in accordance with a determination that the input associated with the one window corresponds to a request to display the one window:
displaying the window in accordance with the global z-order.

14. The computer-readable medium of claim 11, wherein a first set of windows including the first window is associated with the first workspace, where the instructions cause:
receiving input associated with the first set of windows;
in response to receiving the input associated with the first set of windows, in accordance with a determination that the input corresponds to a request to promote the first set of windows with respect to the second window:
modifying the global z-order in accordance with the input to promote the first set of windows with respect to the second window while preserving a relative ordering of the windows of the first set of windows according to respective z-order values associated with the windows of the first set of windows prior to receiving the input associated with the first set of windows; and
displaying the first set of windows in the first workspace according to the relative ordering of the windows of the first set of windows, wherein the windows of the first set of windows at least partially obscure the first instance of the second window according to the relationship between respective z-order values of the global z-order associated with the windows of the first set of windows and the second window.

15. The computer-readable medium of claim 11, wherein the first window is associated with a first application and the third window is associated with a second application, different from the first application.

16. The computer-readable medium of claim 11, wherein the first workspace is associated with a first level and the second workspace is associated with a second level that is higher than the first level, and
the first window is above the third window according to the relationship between respective z-order values of the global z-order associated with the first and third windows,
where the instructions cause displaying the first window and the third window based on the first level and the second level.

17. The computer-readable medium of claim 16, where the instructions cause:
displaying the third window at least partially obscuring the first window in accordance with the second level being higher than the first level.

18. The computer-readable medium of claim 11, wherein a first set of windows including the first window is associated with the first workspace, and a second set of windows including the third window is associated with the second workspace, where the instructions cause:
determining a union set of the first set of windows and the second set of windows; and
displaying the union set of windows according to the relationship between respective z-order values of the global z-order associated with the respective windows of the union set of windows.

19. The computer-readable medium of claim 11, where the instructions cause:
while displaying the first workspace, receiving an input associated with the first window;
in response to receiving the input associated with the first window, and in accordance with a determination that the input corresponds to a request to dissociate the first window from the first workspace and associate the first window with the second workspace disassociating the first window from the first workspace and associating the first window with the second workspace while maintaining the first window in the global z-order wherein the second instance of the second window at least partially obscures the first window in the second workspace according to a relationship between respective z-order values of the global z-order associated with the first and second windows.

20. The computer-readable medium of claim 11, wherein the first, second, and third windows have different positions in the global z-oder.

21. A system comprising:
one or more processors;
a display;
one or more input devices; and
a non-transitory computer-readable medium including one or more sequences of instructions which, when executed by the one or more processors, cause the one or more processors to perform a method comprising:
displaying, on the display, a first workspace including a first window at least partially obscuring a first portion of a first instance of a second window, the first portion at a first relative location in the first instance of the second window, according to a relationship between respective z-order values of a global z-order associated with the first and second windows,
wherein a second workspace includes a third window at least partially obscuring a second portion of a second instance of the second window, the second portion at a second relative location in the second instance of the second window, different from the first relative location, according to a relationship between respective z-order values of the global z-order associated with the second and third windows;
while displaying, on the display, the first workspace, receiving, via the one or more input devices, an input associated with the second window; and
in response to receiving the input, in accordance with a determination that the input corresponds to a request to promote the z-order value associated with the second window with respect to the z-order value associated with the first window in the global z-order:
modifying the global z-order in accordance with the input;
updating the first workspace such that the first portion of the first instance of the second window at least partially obscures the first window in the first workspace; and
updating the second workspace such that the second portion of the second instance of the second window at least partially obscures the third window in the second workspace.

22. The system of claim 21, where the instructions cause:
hiding one of the first window, the first instance of the second window, the second instance of the second window, and the third window while maintaining the one window in the global z-order.

23. The system of claim 21, where the instructions cause:
receiving input associated with the one window;
in response to the input associated with the one window and in accordance with a determination that the input associated with the one window corresponds to a request to display the one window:
displaying the one window in accordance with the global z-order.

24. The system of claim 21, wherein a first set of windows including the first window is associated with the first workspace, where the instructions cause:
receiving input associated with the first set of windows;
in response to receiving the input associated with the first set of windows, in accordance with a determination that the input corresponds to a request to promote the first set of windows with respect to the second window:
modifying the global z-order in accordance with the input to promote the first set of windows with respect to the second window while preserving a relative ordering of the windows of the first set of windows according to respective z-order values associated with the windows of the first set of windows prior to receiving the input associated with the first set of windows; and
displaying the first set of windows in the first workspace according to the relative ordering of the windows of the first set of windows, wherein the windows of the first set of windows at least partially obscure the first instance of the second window according to the relationship between respective z-order values of the global z-order associated with the windows of the first set of windows and the second window.

25. The system of claim 21, wherein the first window is associated with a first application and the third window is associated with a second application, different from the first application.

26. The system of claim 21, wherein the first workspace is associated with a first level and the second workspace is associated with a second level that is higher than the first level, and
the first window is above the third window according to the relationship between respective z-order values of the global z-order associated with the first and third windows,
where the instructions cause displaying the-first window and the third window based on the first level and the second level.

27. The system of claim 26, where the instructions cause:
displaying the third window at least partially obscuring the first window in accordance with the second level being higher than the first level.

28. The system of claim 21, wherein a first set of windows including the first window is associated with the first workspace, and a second set of windows including the third window is associated with the second workspace, where the instructions cause:
determining a union set of the first set of windows and the second set of windows; and
displaying the union set of windows according to the relationship between respective z-order values of the global z-order associated with the respective windows of the union set of windows.

29. The system of claim 21, where the instructions cause:
while displaying the first workspace, receiving an input associated with the first window;
in response to receiving the input associated with the first window, and in accordance with a determination that the input corresponds to a request to dissociate the first window from the first workspace and associate the first window with the second workspace disassociating the first window from the first workspace and associating the first window with the second workspace while maintaining the first window in the global z-order, wherein the second instance of the second window at least partially obscures the first window in the second workspace according to a relationship between respective z-order values of the global z-order associated with the first and second windows.

30. The system of claim 21, wherein the first, second, and third windows have different positions in the global z-order.

31. A method for displaying windows according to a global z-order comprising:
at a computing device with a display and one or more input devices:
displaying, on the display a first workspace including a first window at least partially obscuring a first portion of a second window according to a relationship between respective z-order values of a global z-order associated with the first and second windows, wherein a second workspace includes a third window, the third window having an associated global z-order value in the global z-order,
while displaying, on the display, the first workspace, receiving, via the one or more input devices, an input associated with the second window; and
in response to receiving the input, and in accordance with a determination that the input corresponds to a request to disassociate the second window from the first workspace and associate the second window with the second workspace:
disassociating the second window from the first workspace and associating the second window with the second workspace while maintaining the second window in the global z-order, wherein the third window at least partially obscures a second portion of the second window, different from the first portion of the second window, according to a relationship between respective z-order values of the global z-order associated with the second and third windows.

32. The method of claim 31, wherein the first window is associated with a first application and the third window is associated with a second application, different from the first application.

33. The method of claim 31, wherein the first, second, and third windows have different positions in the global z-order.

34. A non-transitory computer-readable medium including one or more sequences of instructions which, when executed by one or more processors of a computing device with a display and one or more input devices, cause the one or more processors to perform a method comprising:
displaying, on the display a first workspace including a first window at least partially obscuring a first portion of a second window according to a relationship between respective z-order values of a global z-order associated with the first and second windows, wherein a second workspace includes a third window, the third window having an associated global z-order value in the global z-order,
while displaying, on the display, the first workspace, receiving, via the one or more input devices, an input associated with the second window; and
in response to receiving the input, and in accordance with a determination that the input corresponds to a request to disassociate the second window from the first workspace and associate the second window with the second workspace:
disassociating the second window from the first workspace and associating the second window with the second workspace while maintaining the second window in the global z-order, wherein the third window at least partially obscures a second portion of the second window, different from the first portion of the second window, according to a relationship between respective z-order values of the global z-order associated with the second and third windows.

35. The computer-readable medium of claim 34, wherein the first window is associated with a first application and the third window is associated with a second application, different from the first application.

36. The computer-readable medium of claim 34, wherein the first, second, and third windows have different positions in the global z-order.

37. A system comprising:
one or more processors;
a display;
one or more input devices; and
a non-transitory computer-readable medium including one or more sequences of instructions which, when executed by the one or more processors, cause the one or more processors to perform a method comprising:
displaying, on the display a first workspace including a first window at least partially obscuring a first portion of a second window according to a relationship between respective z-order values of a global z-order associated with the first and second windows, wherein a second workspace includes a third window, the third window having an associated global z-order value in the global z-order,
while displaying, on the display, the first workspace, receiving, via the one or more input devices, an input associated with the second window; and
in response to receiving the input, and in accordance with a determination that the input corresponds to a request to disassociate the second window from the first workspace and associate the second window with the second workspace:
disassociating the second window from the first workspace and associating the second window with the second workspace while maintaining the second window in the global z-order, wherein the third window at least partially obscures a second portion of the second window, different from the first portion of the second window, according to a relationship between respective z-order values of the global z-order associated with the second and third windows.

38. The system of claim 37, wherein the first window is associated with a first application and the third window is associated with a second application, different from the first application.

39. The system of claim 37, wherein the first, second, and third windows have different positions in the global z-order.

* * * * *